Feb. 15, 1955 L. E. RYALL 2,702,319
TWO-WAY TELECOMMUNICATION SYSTEM
Filed May 20, 1952 2 Sheets-Sheet 1

Inventor
Leonard E. Ryall
By
Young, Emery & Thompson
Attys.

Feb. 15, 1955 L. E. RYALL 2,702,319

TWO-WAY TELECOMMUNICATION SYSTEM

Filed May 20, 1952 2 Sheets-Sheet 2

Inventor
L. E. Ryall
By Young, Emery & Thompson
Attys.

United States Patent Office
2,702,319
Patented Feb. 15, 1955

2,702,319

TWO-WAY TELECOMMUNICATION SYSTEM

Leonard Ernest Ryall, Watford, England, assignor to Telephone Manufacturing Company Limited, London, England, a British company Application May 20, 1952, Serial No. 288,883

Claims priority, application Great Britain May 29, 1951

13 Claims. (Cl. 179—170.2)

The present invention concerns improvements in or relating to two-way telephone communication systems and in particular to systems employing voice switching from one direction of communication to another. Such voice switching means are employed for example in loudspeaking telephone sets, in echo suppressors and singing suppressors at the terminals between radio links and wire circuits.

Among the objects of the invention are, in a voice switching system of this type, to reduce the operating time, to minimize the adverse effects of signal leakage and coupling between the transmission paths in the different directions and to provide improved "break-in" facilities for signals coming from the path which for the time being is suppressed. Further objects which are achieved will appear from the more detailed description of the invention which follows.

I have described in British Patents Nos. 415,767, 416,372 and 430,567 a method of voice switching in which control currents are derived from the difference of current flowing in the anode circuit of two valves, the control grid potentials of which are dependent on capacitor charges derived from speech signals in the respective transmission circuits whereby the control current flows in one direction or the other according as to whether the signals are being transmitted in one direction or the other. The control currents according to their direction control the open or closed condition of variable attenuation networks in the two paths. Such networks may comprise one or more dry plate rectifiers arranged as either shunt or series elements or both, so that when the path in one direction of communication is in substantially the no-loss condition the path in the other direction is in the high-loss condition and vice versa. The present invention is applicable particularly but not exclusively to such voice switching systems.

Among the requirements of voice switching systems are:

(*a*) Rapid operation of the switches so as to minimize the initial increment of voice energy lost in switching;

(*b*) A delay or hangover in restoring to normal sufficiently long to give continuity of speech between syllables and to suppress reverberation or echo;

(*c*) Facility for either party to break in during the hangover time;

(*d*) A hangover time which does not vary unduly with variation of signal strength;

(*e*) Protection of each signal path from the effects of signal leakage between them or acoustic coupling between them.

These requirements have been satisfied only imperfectly, in particular it is not possible completely to avoid signal leakage, and, in the case of loudspeaking telephones, acoustic coupling cannot be completely eliminated by adjustment of the frequency response of the microphone and loudspeaker instruments and casing and of the frequency content of the signals in the transmit and receive circuits. Also voice switching systems do not in general discriminate between genuine and spurious switching signals as regards the hangover time allotted to them. For example a leakage or echo signal, travelling, say from the transmit to the receive path, can have effect in the same portion of the voice switching circuit as a genuine receive switching signal and may persist for a period as long as the normal switching hangover time of a receive switching signal and can mask the latter and tend to reverse the direction of switching.

With the object of overcoming the adverse effects of signal leakage and/or acoustic coupling between the signal paths and of generally improving the performance, of voice switching systems, according to the invention means are provided for suppressing unwanted switching signals, i. e. those emanating from other than genuine reply or break-in signals, for a time only long enough for such unwanted signals to circulate from the existing "open" path to the other path, in particular for a period beginning at the instant when the said unwanted signals would otherwise appear and ending before the end of the hangover time of the existing switching signal. It will be understood that the terms "open" and "closed" are applied to the paths to indicate a condition in which the loss is at a prescribed minimum and maximum level respectively. More specifically, in a voice switching system means are provided for suppressing switching signals other than genuine reply or break-in signals comprising a network having a time constant smaller than that of the network which provides the hangover time for existing speech signals.

According to a further aspect of the invention, in a voice switching system a time delay network is provided establishing a blocking voltage for spurious signals in the voice switching circuit, said network having a time constant greater than the transit time of the said spurious signals from the existing speech circuit to the voice switching circuit but smaller than the time constant of the time delay network which determines the hangover time for the existing speech signals.

In the preferred system, control potentials derived from rectified portions of the signal energy in the two paths are applied to the respective input circuits of two amplifying valves which control the direction of voice switching, and time delay networks are associated with each of said input circuits, and a further network of smaller time constant is associated with each of said input circuits such that upon the establishment of a control potential at the input of one valve corresponding to speech in one path, the said further network is effective to apply a potential to the input circuit of the other amplifier to suppress leakage signals in the other path during a period falling within the hangover time of the existing speech signal in the first path and expiring before the end of the said hangover time.

According to a further feature of the invention, the variation of hangover time of the genuine control signals derived from the existing speech in either of the paths is restricted upon increase of the signal above a given level. In the case where control voltages derived from the speech signals are applied to the control grids of two amplifying valves the hangover variation with signal level is limited to a greater extent than that imposed by flow of grid current in the respective valve. The hangover time is dependent in part on two networks of different time constant, and for control signals below the value causing flow of grid current the hangover time depends on a given potential distribution in the said two networks, whilst for control signals above that level the hangover time increases at a lower rate with respect to signal strength and is dependent on a different potential distribution in the two networks.

The above and other features of the invention and the advantages achieved thereby will be apparent from the following more detailed description of an exemplary embodiment thereof with reference to the accompanying drawings.

Figure 1:
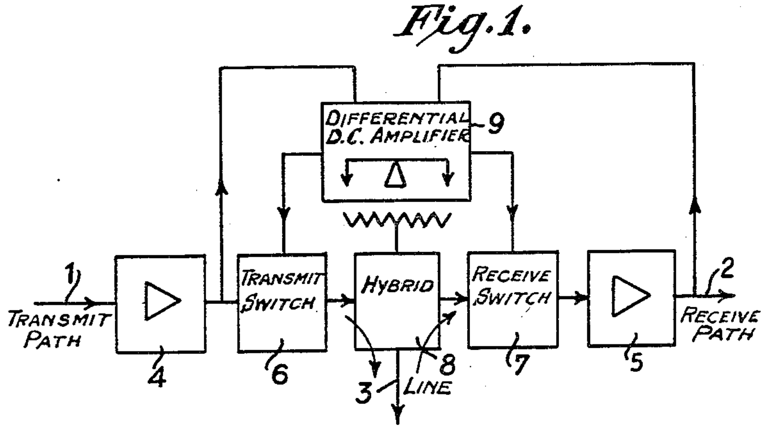
Fig. 1 is a block schematic diagram illustrating the principle of one type of voice switching system.

In Fig. 1 the system for effecting voice switching as between a transmit path 1, e. g. from a microphone, and a receive path 2, e. g. to a loudspeaker, connected to a line 3, comprises transmit and receive amplifiers 4 and 5, transmit and receive voice switches 6 and 7, a hybrid coil 8 linking the two paths with the line, and a differential D. C. amplifier 9 controlling the operation of the two switches. A part of the output of transmit amplifier 4 controls the differential amplifier 9 and a further part is transmitted to line via the transmit switch 6 and hybrid coil 8 in such a manner as to obtain a suitable frequency response characteristic between microphone and line.

The receive voice switch 7 is connected to the input side of the receive amplifier 5, which controls the differential amplifier 9 and is connected to the receive path.

Figure 2:
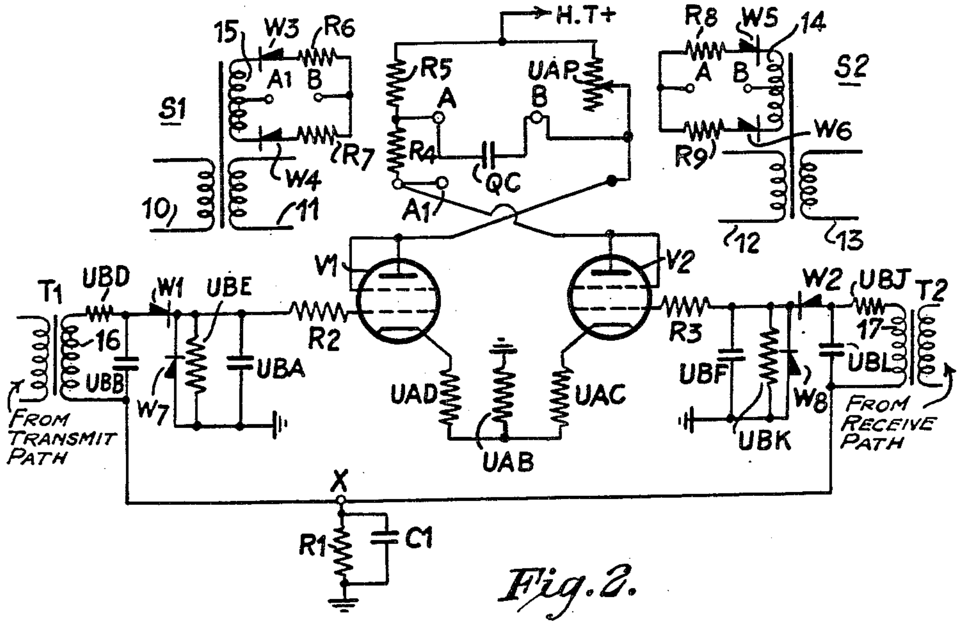
Fig. 2 is a more detailed circuit schematic of a differential D. C. amplifier and variable attenuation voice switching networks employed in a system according to the invention.

Fig. 2 indicates the schematic circuit of a differential D. C. amplifier used to control two voice switches of the variable attenuator type.

The amplifier consists of two valves $V_1$ and $V_2$ whose output is applied to the points A, B.

There are two voice switches of the variable attenuator type indicated by $S_1$ and $S_2$ in the transmit and receive paths respectively, and these are operated differentially by the D. C. amplifier, i. e. when the transmit path is attenuated the receive path is open and vice versa. Consider for example switch $S_2$ in the receive path. Normally, when the switch is open speech signals in the receive path pass from transformer winding 12 to winding 13 and thence to load. The output of the amplifier at points A, B is connected to the corresponding points of switch $S_2$.

Application of a D. C. potential to points A and B of switch $S_2$ makes the rectifiers $W_5$, $W_6$ conducting or non-conducting according to polarity. In the conducting condition, the impedance presented to the centre tapped winding 14 is low and partially short circuits the load impedance at 13, and the signal is attenuated to an extent determined by resistors $R_8$, $R_9$. Reversal of the D. C. polarity at points A, B increases the rectifier impedance, so that winding 14 is virtually open circuited and signal energy from the source passes to the load with negligible attenuation. Points A and B of the switch are the balance points of a bridge formed by the two halves of winding 14 and the rectifiers and resistors $W_5$, $R_8$ and $W_6$, $R_9$ respectively. With substantial similarity between the rectifiers, negligible A. C. potential appears across points A and B.

The transmit switch $S_1$ operates in a similar manner to vary the transfer of signal energy in the transmit path from transformer winding 10 to the load winding 11, except that the rectifiers $W_3$ and $W_4$ are connected in the reverse sense to those of switch $S_2$ with respect to the amplifier output. Also transmit switch $S_1$ is connected to points $A_1$, B, of the amplifier. If both networks were connected between the points A and B of the amplifier in opposite directions the total attenuation for zero control current in the amplifier output would be small and the system would be unstable. A resistor $R_4$ of 30 ohms between A and $A_1$ ensures that when points A and B of the amplifier are at the same potential there is a control voltage between B and $A_1$ of approximately 0.5 volt, which provides adequate attenuation to prevent instability. The circuits are arranged such that there is a sufficient change in attenuation of the transmit and receive paths when the control voltage at points A, B varies between $\pm 4.0$ volts.

Under normal conditions there is no potential difference between points A, B of the amplifier, which are the balance points of a bridge formed by resistor $R_5$, potentiometer UAP, and the resistor $R_4$ and the equivalent static anode resistances of valves $V_1$ and $V_2$. UAP permits accurate balancing of the bridge.

In operation, a portion of the speech energy in the transmit path is applied to transformer $T_1$, is rectified by the transmit rectifying network UBD, UBB, $W_1$ and applied as a switching signal to the control grid of valve $V_1$ through a resistor $R_2$. Similarly speech energy in the receive path is applied to transformer $T_2$, is rectified by the receive rectifying network, UBJ, UBL, $W_2$ and is applied as a switching signal to the control grid of valve $V_2$.

Considering only the transmit path, the switching signal appears as a positive voltage at the control grid of $V_1$ whose anode current increases, and point A becomes more negative than B. This effect is further intensified by the connection of the cathodes of $V_1$ and $V_2$ to earth through resistor UAB, across which there is an increased potential difference due to the higher anode current of $V_1$. Consequently the cathode of $V_2$ becomes more positive relative to earth and, since the $V_2$ control grid is at earth potential, this grid becomes more negative with respect to its cathode. Hence, as the anode current of $V_1$ rises, that of $V_2$ falls, and the total potential difference between the points A and B is greater than it would be if only one valve were operating. The positive voltage applied to the control grid of $V_1$ is limited by grid current. This is advantageous in limiting to some extent the increase of discharge time of the capacitor UBA with increase of signal level in the transmit path.

Since the circuit is symmetrical, operation of it from the receive side is similar in effect, except that the output potential difference is reversed in polarity.

The amplifiers $V_1$ and $V_2$ may be separate from the speech amplifiers, or, as in the preferred embodiment, the amplifiers $V_1$ and $V_2$ may form one or more stages of the speech amplifiers. This is possible since, in the circuit of Fig. 2, the change in anode current of $V_1$ is limited by grid current, which ensures that the control grid voltage of $V_2$ does not vary outside the limits for satisfactory Class A amplification. Consequently valve $V_2$ may amplify the speech signals in the transmit path at the same time as valve $V_1$ is amplifying the rectified transmit switching signal to close the receive path against speech signals. Similarly, when the switching is reversed, $V_1$ may take part in amplifying the receive signals whilst $V_2$ amplifies the rectified portion of the receive signal to close the transmit path. Capacitor QC is connected across the output points A and B to reduce the leakage of signals from one path to the other.

If the hybrid coil linking the two paths to the line is properly balanced no signal current should pass from the transmit amplifier to the receive amplifier. Having regard to the practical difficulties in obtaining a perfect balance particularly with lines such as public exchange lines whose impedance may vary, it is found in practice that speech from the transmit amplifier can reach the receive amplifier:

(*a*) Via the hybrid unbalance and through the receive attenuator network, which has limited attenuation, and (*b*) Via the control current path from the anode circuits of the two valves due to inadequate decoupling to earth. Increasing this decoupling, however, will slow down the operating time of the switches.

Similarly speech from the receive amplifier can reach the transmit amplifier:

(I) In a loudspeaking telephone system via the acoustic coupling between microphone and loudspeaker, and (II) As (*b*) above.

Unless the effects of this signal leakage and coupling are counteracted the efficacy of the differential switching D. C. amplifier will be reduced by the appearance of positive control grid voltages simultaneously at both of the switching valves.

Consider first the effect of signal leakage in the transmit path. Some of the speech energy will be applied to the half wave rectifier $W_2$ associated with the receive path in opposition to the existing switching condition, and an increased transmit switching sensitivity will be required to effect this offset. At the same time the effect of speech from the line trying to break in will be masked by the unwanted rectified signal. Also, if the unwanted signal is subject to the same hangover time as the genuine signal, i. e. 0.25 to 0.3 second, it will also be maintained between words and syllables.

The break-in facility in the reverse direction, i. e. speech into the microphone trying to break-in against speech from line will be similarly adversely affected.

If rectified signal voltages are applied to the control grids of both valves simultaneously and the switching operation depends on the difference in magnitude of these voltages it is very important that, in a system where the effect of signal leakage cannot be prevented, the time constants associated with the decay of these voltages should be the same. Slight differences have a marked effect on the resultant "hangover" switching times and may even produce reverse switching. Thus, a leakage signal voltage rectified by $W_2$ will appear almost instantaneously with a switching signal voltage rectified by $W_1$, and, if the former has a longer time constant, a reverse switching voltage will ultimately appear.

In order to minimise the effects of signal leakage and to obtain preferential treatment of genuine switching signals as distinct from spurious switching signals, the following circuit arrangement is provided.

Resistance-capacity networks UBE, UBA, and UBK, UBF are associated with the control grids of the respective valves, $V_1$ and $V_2$ and, via $W_1$, UBD and winding 16 of transformer $T_1$, and via $W_2$, UBJ and winding 17 of transformer $T_2$ respectively, are connected to a common resistance-capacity network $R_1C_1$, of much smaller time constant than either of the R-C combinations UBE, UBA and UBK, UBF, such that a rectified voltage applied to a respective control grid is distributed initially across $R_1C_1$ and the respective R-C network in series therewith.

The signal input R-C networks UBE, UBA and UBF, UBK may each have time constants of 0.25 to 0.3 sec. Resistor $R_1$ and capacitor $C_1$ are approximately each one half or less the value of resistors UBE, UBK, and capacitors UBA, UBF so giving a time constant of one quarter or less that of the R-C networks UBE, UBA, and UBF, UBK. For example $R_1$ may be 1 megohm and $C_1$ 0.05 microfarad giving a time constant of 50 millisecs. Also $R_1$ is chosen as greater than series resistors $R_2$ and $R_3$ which may each have a value of 0.5 megohm.

Resistor UBD and capacitor UBB in the transmit switching path and their counterparts UBJ and UBL on the receive switching path are optional and are used to obtain frequency discrimination of the switching sensitivity. For example, at the higher frequencies unbalance in the hybrid is more serious, and, as compared with low frequencies the level of the signals transmitted to line from the transmit amplifier increases at the expense of the proportion of the signals used for voice switching. The receive rectifying network is therefore made to discriminate against the higher frequencies by resistor UBJ and capacitor UBL giving for example a loss of 3 db at 1 kc./s. Such discrimination does not, however, prevent leakage switching signals from reaching the receive switching path.

Consider a signal in the transmit path; a portion of this is rectified by the half wave rectifier $W_1$ and the rectified voltage is applied to the two resistor-capacitor combinations UBE, UBA and $R_1C_1$ in series. Initially the voltage divides inversely as the values of the capacitors UBA and $C_1$, i. e. ⅓ is received across UBA and ⅔ across $C_1$, but the final voltage ratio is determined by the values of the resistors, i. e. ⅔ across UBE and UBA and ⅓ across $R_1$ and $C_1$. When the voltage obtained across the UBE, UBA network exceeds that which is sufficient to cause grid current to flow, $R_2$ and the grid-cathode impedance are effectively in shunt across UBE and the excess voltage divides between the two R-C networks in a different proportion from the initial voltage, i. e. approximately in proportion to $R_2$ in parallel with UBE and in proportion to $R_1$ across $R_1$ (neglecting the grid-cathode impedance). Since $R_2$ has a value one half of $R_1$ less than ⅓ of this excess voltage is built up across UBE whilst at least ⅔ is built up across the common resistor $R_1$. Thus the variation of discharge time of the voltage obtained across UBE with large, as compared with small input signal voltages, is reduced and hence the resultant hangover time is more constant and not unduly long after loud signals or unduly short after weak signals. Also voltage across the common resistor $R_1$ increases rapidly when the signal from the transmit path exceeds that which produces grid current in the transmit valve.

Now consider the action of the voltage obtained across the common resistor-capacitor combination $R_1C_1$. As explained above this voltage varies in the same sense as the signal level, e. g. the stronger is the signal the larger is the switching voltage rectified by $W_1$ and consequently the larger is the voltage across $R_1C_1$. This voltage makes the point X, common to both rectifier circuits, negative and therefore prevents any signal in the receive path from being rectified by the half wave rectifier $W_2$ until the applied signal voltage exceeds the voltage across the common resistor-capacitor combination $R_1C_1$; but the time constant of $R_1C_1$ is very short so that whilst it is long enough to prevent the "leakage" speech through the amplifier and hybrid or via the direct acoustic path between loudspeaker and microphone from being rectified, it sensibly follows the syllabic variations of speech volume and so permits any genuine reply or "break-in" signals from the line and receive path to be rectified and to reverse the voice operated switch. The operation is similar with speech incoming from the line and rectified by the half wave rectifier $W_2$ on the receive side in that the voltage obtained across $R_1C_1$ prevents the half wave rectifier $W_1$ on the transmit side from rectifying leakage signals and the speech picked up by the microphone from the loudspeaker whilst allowing speech interruptions from the microphone user to be rectified by the half wave rectifier on the transmit side between syllables when the voltage across $R_1C_1$ is discharged.

The use of the common resistor-capacitor combination $R_1C_1$ of short time constant compared with that required to give satisfactory voice switching thus enables improved break-in to be obtained.

If the reverse resistance of the rectifiers $W_1$ and $W_2$ is not very high compared with that of resistors UBE and UBK then a portion of the negative potential obtained at the junction point X when speech energy is being rectified, say by the transmit rectifier $W_1$ may be transferred via the reverse resistance of the other rectifier to the control grid circuit of the transmit speech amplifying valve $V_2$, and may produce excess negative grid voltage bias distorting the amplification. This can be avoided by shunting the resistors UBE and UBK by rectifiers $W_7$ and $W_8$ such that the conducting direction is from earth to any negative potential that may be obtained across UBE and UBK and so preventing any excess negative potential from being obtained. These rectifiers do not prevent the normal production of a positive grid bias voltage as described above.

In addition to the leakage signal suppression and improved break-in, other advantages are achieved (some of which have already been mentioned), e. g.

(1) The maximum difference in the anode currents of the switching valves in the differential amplifier is maintained which ensures that the maximum control voltage is available.

(2) In the case where the valves $V_1$ and $V_2$ serve also as speech amplifiers, the optimum operating conditions of the valve which is amplifying the speech at any instant are maintained. Otherwise, if the negative grid bias voltage of the speech amplifier were reduced by unwanted rectified signals, signal distortion might occur, particularly on large amplitude signals.

(3) The method employed avoids increasing the anode current unnecessarily which would give a poorer voltage regulation, reduce the amplifier overload capacity and increase the power consumption.

(4) The hangover times of the transmit switching signals are more uniform for different level signals, and a similar advantage is obtained for the receive switching signals.

(5) Different time constants can be used for the R-C networks UBE, UBA of the transmit switch and UBF, UBK on the receive side determining the switching hangover times. The receive combination UBF, UBK need only have a short time constant since the receive path is low loss in the quiescent state, for example it could be only twice that of the guard circuit $R_1C_1$, although theoretically it could even be decreased to be equal to the time constant of $R_1C_1$ plus the very much shorter circulation time of the leakage signal from one side of the differential amplifier to the other, whilst for optimum operating conditions the transmit combination UBE, UBA requires to have a longer time constant as the transmit path becomes high loss before the voltage across UBA, UBE has discharged to zero. By increasing this time constant the transmit switching sensitivity, measured by steady signal, can be reduced as there is less tendency for switching to fall out between syllables.

Figure 3:
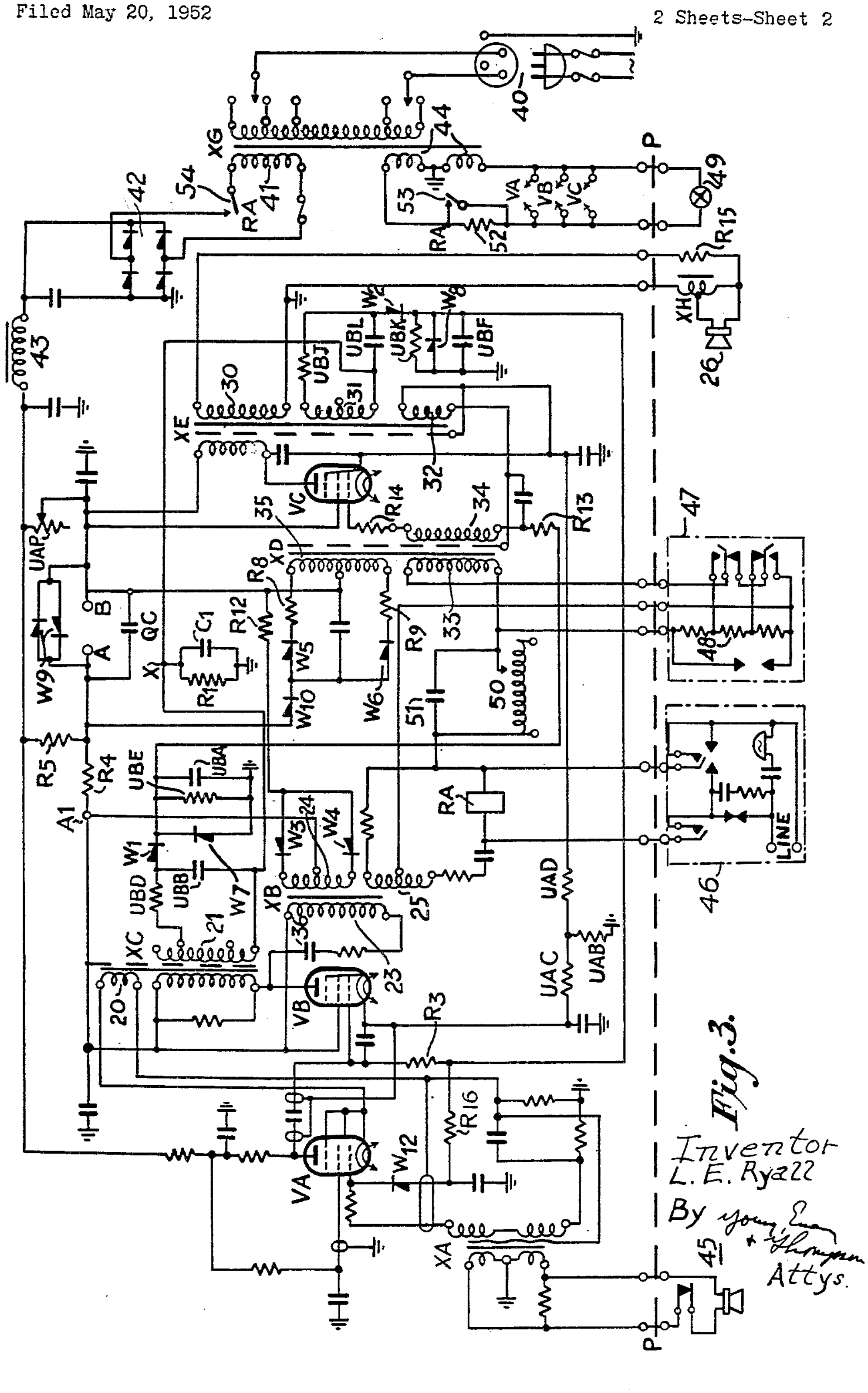
Fig. 3 is a schematic circuit diagram of a complete voice switching system.

A circuit schematic of a complete loudspeaking telephone system employing a voice switching system similar in principle to that in Fig. 2 is shown in Fig. 3. In this system a valve in each of the speech amplifiers is also employed in the D. C. amplifier for the rectified switching signals. Components corresponding to those in Fig. 2 are indicated by like references.

Considering first the speech amplifying function, the transmit amplifier is a two-stage R-C coupled pentode amplifier comprising valves VA and VB and input transformer XA. The amplifier employs approximately 20 db negative feedback over a major portion of the bandwidth, this being derived from winding 20 of the anode transformer XC and applied in series with the cathode of valve VA. The output from VB is fed to line via secondary winding 25 of hybrid transformer XB.

The receive amplifier consists of input transformer XD, valve VC and output transformer XE whose winding 30 is connected to the loudspeaker 26. The primary winding 33 of XD is connected to line through hybrid XB. The pentode VC employs about 12 db negative feedback over the major portion of the bandwidth, this being derived from secondary winding 32 of XE and applied in series with XD secondary winding 34.

Considering now the voice switching function, the differential D. C. amplifier consists of valve VB and resistors $R_4$ and $R_5$ on one side, with valve VC and potentiometer UAP on the other, the balance points for this bridge being A, B. Valves VB and VC therefore correspond to $V_2$ and $V_1$ of Fig. 2 so far as the switching function is concerned.

The rectifiers $W_9$ connected across the points AB, prevent the control voltage at A, B rising to an unduly high value under fault conditions and possibly damaging the voice switch rectifiers $W_3$ to $W_6$.

The transmit attenuating network is formed by XB secondary winding 24 with associated rectifiers $W_3$, $W_4$, and is connected to point A through point $A_1$ and resistor $R_4$ and to point B through resistor $R_{12}$.

Winding 35 of transformer XD and the associated rectifier-resistor network $W_5$, $R_8$, $W_6$, $R_9$ forms the receive attenuating network, again connected to A, B, via rectifier $W_{10}$ on one side and directly on the other. So far as the conducting direction of the attenuator rectifiers is concerned the two attenuating networks are thereby connected to A, B in opposite senses, thus ensuring the required "see-saw" operation of the switches.

On the receive side the voice rectifying network is that connected to XE secondary winding 31 so that rectified signals from line apply a positive bias to VB grid through resistor $R_3$, thus unbalancing the D. C. amplifier bridge in the manner described above with reference to Fig. 2 and in such a sense that current flows through the rectifiers $W_3$, $W_4$ connected to XB winding 24. The hybrid transformer XB is, therefore, in effect short circuited, with the result that signals from the transmit amplifier cannot pass to line.

For the reverse operation, signals from the transmit amplifier are rectified by the network connected to XC winding 21 and the resulting positive switching bias applied to VC grid through resistor $R_{13}$, winding 34 and resistor $R_{14}$ equivalent to the resistance of $R_2$ in Fig. 2, unbalances the bridge in the opposite sense to that just described, so that rectifiers $W_5$, $W_6$ are conducting and XD is now short circuited but XB is not. Signals can now pass from the transmit amplifier to line, but those from line may not pass to the receive amplifier.

The rectifiers $W_1$ and $W_2$ used in the voice rectifying networks are half-wave rectifiers. Thus, when the anode current of valve VB increases suddenly, due to the application of a switching signal to its control grid from the output of the receive amplifier VC, the resultant voltage surge in the winding 21 of XC is not rectified and reverse switching is prevented. When the switching signal ceases, the anode current of valve VB decreases relatively slowly due to the time constant of approximately 0.25 sec. of the R-C combination UBK, UBF, and only a small voltage is obtained across winding 21 of XC. The presence of this voltage, in tending to reverse the action of the voice switching is to hasten the restoring time of the switches, and this is taken into account in determining the time constant of the R-C combination referred to. Similar conditions arise when switching signals are applied to the control grid of VC.

In order to reduce the reverberation effects of microphone speech mostly occurring at low frequencies, means are provided for reducing the low frequency content of the signals transmitted to line. This is achieved by using an output transformer XB of low inductance connected in series with a capacitor 36 to form a high pass filter with a cut-off of approximately 1 kc./s. and a slope of minus 12 db per octave below that frequency. The rising response characteristic of the microphone at low frequencies (which is used to obtain satisfactory voice switching) partially compensates for this otherwise severe attenuation of the low frequency sounds.

As contrasted with the reduction of low frequency in signals transmitted to the line, the switching sensitivity of the transmit amplifier is preferably made substantially flat between 300 and 5,000 c./s., and the microphone is designed to be most sensitive at frequencies around 300 c./s., so that the low frequency components of speech readily effect the switching. Speech signals from the loudspeaker are, however, deficient in low frequency components, partly due to the response characteristics of the distant end transmitter already discussed and the frequency characteristics of the line equipment. This deficiency is further accentuated by the resistor $R_{15}$ in series with the low inductance transformer XH which reduce the low frequency response of the loudspeaker relative to the switching sensitivity of the receive amplifier.

In order to counteract the tendency for the switching to be reversed by random noises reaching the microphone, when the incoming signal to the receive amplifier is weak, the rectified signal voltage applied to the control grid of VB is also applied via a resistor $R_{16}$, to bias a rectifier $W_{12}$ connected to the secondary winding of the input transformer XA. The rectifier impedance is decreased and a shunt loss of about 10 db is thereby applied to the transformer XA.

The power for the amplifiers is supplied from A. C. mains through a fused plug and socket 40 and transformer XG providing the high-tension supply through winding 41 rectifier network 42 and smoothing circuit 43, and the low-tension supply for the cathode heaters through winding 44 and the tappings indicated at VA, VB, VC. The chain line P—P represents the amplifier panel outside which, in addition to the loudspeaker 26 and microphone 45, are mounted the "answer and dial" unit 46 through which connection is made to the line, and a volume control 47 controlling the amplification of the receive amplifier VC in steps of about 10 db through potentiometer 48.

To prevent false switching by mains hum a broadly tuned 100 c./s. rejector, comprising tapped inductor 50 and capacitor 51, is connected in series with the receive input transformer.

When the supply is switched on but the equipment is quiescent, the cathode heaters and a pilot lamp 49 are semi-energized via resistor 52 to provide immediate operation when required. When a call is made or answered the relay RA is connected across the line and operated by the line current. The resistor 52 is short-circuited by relay contacts 53 and normal voltage is applied to the cathode heaters and indicator lamp, which now glows brightly, and the full H. T. supply is connected to the valves via relay contacts 54. The quiescent consumption is 15 volt-amps, rising to double this amount when the equipment is in use.

While the invention is of particular importance with relation to loudspeaker operation on private or public lines it is also applicable to other forms of two-way transmission, such as singing suppressors for radio links, open wire or cable circuits where the "echo" time is less than the hangover time required to bridge the gaps between words and syllables. The "echo" time is the time for the signal to circulate from the "go" to the "return" path or vice versa. The time constant of the common resistor-capacitor combination $R_1C_1$ is then made approximately equal to or slightly greater than the "echo" time, but will still be less than the hangover time required to bridge the gaps between words and syllables.

I claim:

1. A telecommunication system having at the same station transmit and receive paths, voice operated switching means for said paths comprising two amplifying devices, voice switches operated by the outputs of said amplifying devices, an input signal circuit for each amplifying device, means connected to said respective input circuits for deriving switching signals from the speech energy in the transmit and receive paths respectively, a time delay network for each of said input signal circuits and a further delay network common to each of the input signal time delay networks and having a time constant smaller than that of at least one of said networks, said third time delay network developing a guard voltage dependent on the level of the switching signal voltage applied to one of said input signal circuits to suppress the effect of a leakage signal at the other one of said input signal circuits.

2. A telecommunication system having at the same station a transmit and a receive path, means individual to said paths for introducing loss therein, voice operated control means for said loss introducing means comprising a D. C. amplifying device, two input circuits for said amplifying device, an output circuit developing control voltages dependent on the relative input voltage levels, means connected to said respective input circuits for deriving rectified switching signals from the transmit and receive paths respectively, a time delay network for each of said input signal circuits and means for suppressing the reverse switching effect of leakage of speech signals between the two paths comprising a further time delay network having a time constant smaller than that of at least one of said input signal time delay networks, said third time delay network being connected to said input signal circuits so as to receive a portion of the rectified voltage appearing at one of said input signal circuits to suppress the effect of a leakage signal at the other one of said input signal circuits.

3. A telecommunication system as claimed in claim 2 wherein the time constant of the time delay network of the transmit input signal circuit is greater than that of the time delay network of the receive input signal circuit, and the latter time constant is equal to or greater than the time constant of the said further time delay network.

4. A telecommunication system having at the same station transmit and receive paths, voice operated switching means for differentially controlling the loss in said respective paths comprising a voice switch for each path, a differential D. C. amplifier including two amplifying devices, an output circuit for said amplifier connected to the voice switches, an input signal circuit for each amplifying device, means connected to said respective input circuits for deriving rectified switching signals from the transmit and receive paths respectively, a time delay network for each of said input signal circuits the time delay network for the transmit input signal circuit being long enough to bridge the gap between syllables, and means for shortening the operating time for switching from the receive to the transmit condition comprising a third time delay network common to each of the input signal time delay networks, said third time delay network developing a guard voltage dependent on the level of the rectified voltage at the transmit input signal circuit to suppress the opposite effect of a leakage signal at the receive input signal circuit, and said third time delay network having a time constant so much shorter than the time constant of the transmit time delay network that said guard voltage can follow the syllabic variations of level of the transmit speech whilst allowing break in of genuine switching signals from the receive path.

5. A telecommunication system as claimed in claim 4 wherein said differential D. C. amplifier comprises two amplifying valves and a common resistor is provided in the cathode circuits of said two valves such that a positive switching signal applied to the control grid of one valve causes an increase of anode current of that valve and a fall in the anode current of the other valve, and said voice switching means for the two paths are connected to D. C. control voltage points in the anode circuits of said amplifying valves.

6. A system as claimed in claim 5 having in each path a voice switch comprising a variable attenuation network including dry plate rectifier elements, each of said networks being connected in opposite polarity relation to the appropriate D. C. control voltage points of said D. C. amplifier.

7. A telecommunication system as claimed in claim 4 wherein said differential D. C. amplifier comprises two amplifying valves each having a control grid circuit for receiving the rectified switching signals from the respective speech path, said amplifying valves also serving wholly or in part for amplifying the speech signals in said respective paths.

8. A telecommunication system as claimed in claim 7 wherein the voice switching control circuit and the speech amplifying circuit are arranged such that whilst one of the speech amplifiers is amplifying the existing speech signals a valve comprised in the other speech amplifier is amplifying the switching control signal derived from a portion of the rectified output of the first speech amplifier.

9. A telecommunication system according to claim 8 comprising a transformer and a rectifier associated with each speech path for deriving rectified switching voltages therefrom, and wherein said rectified switching voltage is applied across said common time delay network and the respective one of said input signal circuit time delay networks in series, and an additional rectifier is shunted across each input signal circuit time delay network for preventing excess negative potential from appearing at the control grid circuit of the amplifying valve which for the time being is amplifying the speech.

10. A telecommunication system having transmit and receive paths at the same station, a voice switch individual to each path, D. C. amplifying means for differentially controlling said voice switches comprising two amplifying devices having output circuits in operative connection with said voice switches, a control grid for each amplifying device connected to an input signal circuit, means connected to said respective input signal circuits for deriving rectified switching signals from said transmit and receive paths, a resistance-capacity time-delay network for each input signal circuit to afford appropriate hangover times of the switching signals, and a third resistance-capacity network common to each input signal circuit and having a smaller time constant than at least one of said input signal time delay circuits, said third resistance-capacity network developing a guard voltage dependent on the level of the speech signals and persisting only long enough to prevent the appearance of leakage signals at the respective one of said input signal circuits when a rectified switching signal is applied to the other input signal circuit.

11. A telecommunication system as claimed in claim 2 wherein the rectified voltage appearing at either one of said input signal circuits is applied across two resistance capacity networks in series one of which is the time delay network of the respective input signal circuit and the other of which is the common time-delay network, the voltage distribution across the resistances of said two networks determining the relative magnitudes of the switching signal which is applied to the control grid and the guard voltage applied to the other input signal circuit.

12. A telecommunication system as claimed in claim 11 wherein the resistances of the respective control grid circuits and of the resistance-capacity networks associated therewith are chosen such that flow of grid current caused by increase in the level of the switching signal at the control grid alters the voltage distribution across said two series-connected resistance-capacity circuits in the sense of equalizing the hangover times for varying levels of speech signal.

13. A system as claimed in claim 12 wherein series resistance is included in each control grid circuit, said resistance being effectively in parallel with the input signal resistance-capacity network when grid current flows, so that the proportion of the rectified voltage distributed across said common resistance-capacity network increases at the expense of the proportion of said rectified voltage across the input signal resistance-capacity network with increase of level of the speech signals.

References Cited in the file of this patent

UNITED STATES PATENTS

| | | |
|---|---|---|
| Re. 21,835 | Mitchell | June 17, 1941 |
| 2,267,622 | Mitchell | Dec. 23, 1941 |
| 2,468,552 | Herrick | Apr. 26, 1949 |
| 2,472,211 | Herrick | June 7, 1949 |
| 2,545,467 | Jeanlin | Mar. 20, 1951 |
| 2,545,476 | Levy | Mar. 20, 1951 |